United States Patent [19]

Stancati

[11] 4,007,941
[45] Feb. 15, 1977

[54] SEAL FOR DUCT TERMINATOR

[75] Inventor: Nicholas F. Stancati, Basking Ridge, N.J.

[73] Assignee: ACTA Limited, Manville, N.J.

[22] Filed: July 24, 1975

[21] Appl. No.: 598,855

[52] U.S. Cl. .......................... 277/178; 285/137 R; 425/DIG. 47
[51] Int. Cl.² ........................................ F16J 15/10
[58] Field of Search .............. 285/137 R, 288, 291, 285/158; 277/178, 181–186; 425/DIG. 47

[56] References Cited

UNITED STATES PATENTS 3,493,237    2/1970    Kleindienst .................. 277/178

Primary Examiner—Robert I. Smith
Attorney, Agent, or Firm—Anthony J. Casella

[57] ABSTRACT

A seal for a duct terminator, that is adapted to be formed with an underground utility vault, is secured to the bell-mouth portion of the duct terminator, and is operative to facilitate the molding of the utility vault, and after being embedded in the utility vault, provides additional seals to prevent water from entering the utility vault. The seal is an endless, flexible member having a generally H-shaped cross-section, with two of the legs of said seal being adapted to engage the bell-mouth end of the duct terminator, while the other two legs are embedded in the concrete vault so as to provide two sealing or water stop means to prevent water from entering the vault when the latter is subjected to thermal expansion and contraction.

6 Claims, 6 Drawing Figures

SEAL FOR DUCT TERMINATOR

DESCRIPTION OF THE INVENTION

The present invention relates to a new and improved duct terminator, and more particularly a seal adapted to be secured to a duct terminator to facilitate the construction of an underground utility vault, and to provide additional sealing means around the duct terminator embedded in the underground utility vault.

Underground utility vaults are employed for underground electrical or telephone systems, and generally comprise a concrete structure having a plurality of plastic duct terminators embedded therein. In order to enable the interconnection of electrical and telephone lines, the lines are ducted through conventional plastic piping, which plastic piping is eventually received within the duct terminator of the underground utility vault, and the electrical and telephone lines are interconnected within the utility vault. In order to prevent shorting of the electrical and telephone lines, the vaults are constructed so as to be sealed against water, even though portions of the entire vault may be below the water table of the street.

The conventional plastic duct terminator is generally cylindrical in configuration, and includes a water stop rib which is disposed intermediate the length of the duct terminator, and is intended to operate as a water stop for effectively sealing off moisture from entering the utility vault upon expansion and contraction of the concrete structure due to thermal variations. Internally of the duct terminator there is molded into a knock-out seal which is easily knocked-out when it is desired to duct electrical or telephone lines into the vault. At the opposite end of the duct terminator there is usually provided a bell mouth or flared portion which is embedded within the interior walls of the vault in order to facilitate the bending of the electrical and telephone cables.

In the construction of an underground utility vault, it has been the practice to provide concrete forms having on the interior portions thereof holding plugs which are engaged by the annular edge of the duct terminator for locating the duct terminator prior to the pouring of the concrete into the forms. On the opposite form wall, which abuts against the bell-mouth portion of the duct terminator, it has been the practice to employ rubber holding plugs that are reused with the construction of each utility vault. One of the problems that has arisen in the use of the holding plugs is that the life of such plugs has been very limited, and since the plugs are costly, the overall cost of construction of the concrete vault becomes expensive. In addition, since the holding plugs are reused, additional man hours are required for cleaning of the plugs after each use. Still further, the resulting concrete utility vault employing merely a conventional plastic duct terminator only includes a single seal or water-stop to prevent water from seeping into the underground utility vault.

Accordingly, it is the object of the subject invention to overcome the shortcomings of the prior art devices, and provide new and improved means for providing better sealing means for duct terminators embedded in an underground utility vault, and at the same time facilitate the construction of the underground utility vault so as to result in an improved underground utility vault.

More particularly, the subject invention provides a seal adapted to be secured to the bell-mouth or flared end of a duct terminator, which seal comprises a flexible endless member, of generally annular configuration, having a generally H-shaped cross-section. Two of the legs of said H-shaped member are spaced so as to frictionally engage the flared end of the duct terminator, while the opposite legs of said flexible member extend radially outwardly from the flared end of the duct terminator. One of the latter legs is of greater length than the other leg, and extends outwardly from the flared end of the duct terminator to form a bell-mouth portion. When the seal is mounted on the duct terminator, and the latter is placed between the concrete forms for the underground utility vault, the bell-mouth leg portion of the seal is reversibly bent, and concrete is formed on opposite sides thereof, as well as on opposite sides of the other free leg portion of the seal. By this arrangement, two additional water stops or ribs are provided for each duct terminator, thereby enhancing the water resistant characteristics of the duct terminator. Still further, by virtue of the bell-mouth portion of the seal, it is not necessary to provide, as in the prior art, the reusable rubber holding plug, thereby substantially decreasing the cost of construction of the underground utility vault, as well as reducing the amount of time required to construct the underground utility vault.

These and other objects and advantages of the subject invention will become apparent from a reading of the following detailed specification taken in conjunction with the accompanying drawings in which.

Figure 1:
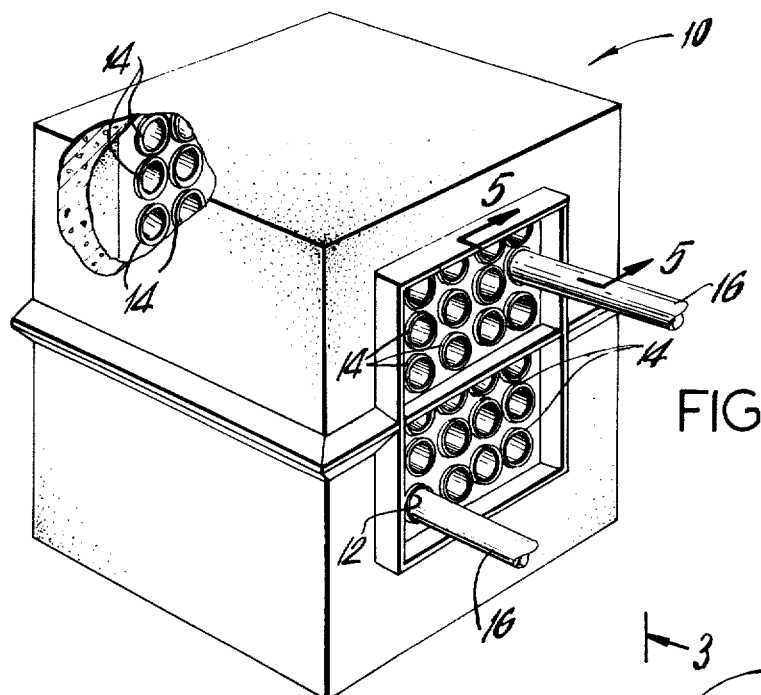
FIG. 1 is a perspective view of an underground utility vault, partially in section.

Referring to FIG. 1, an underground utility vault for underground electrical or telephone systems is designated by numeral 10, and basically comprises a concrete box having opposed openings 12 in the walls thereof, with duct terminators 14 being provided in the openings. The duct terminators are adapted to receive plastic pipes 16 which function as housings or shielding conduits for the electrical and telephone lines.

Figure 2:
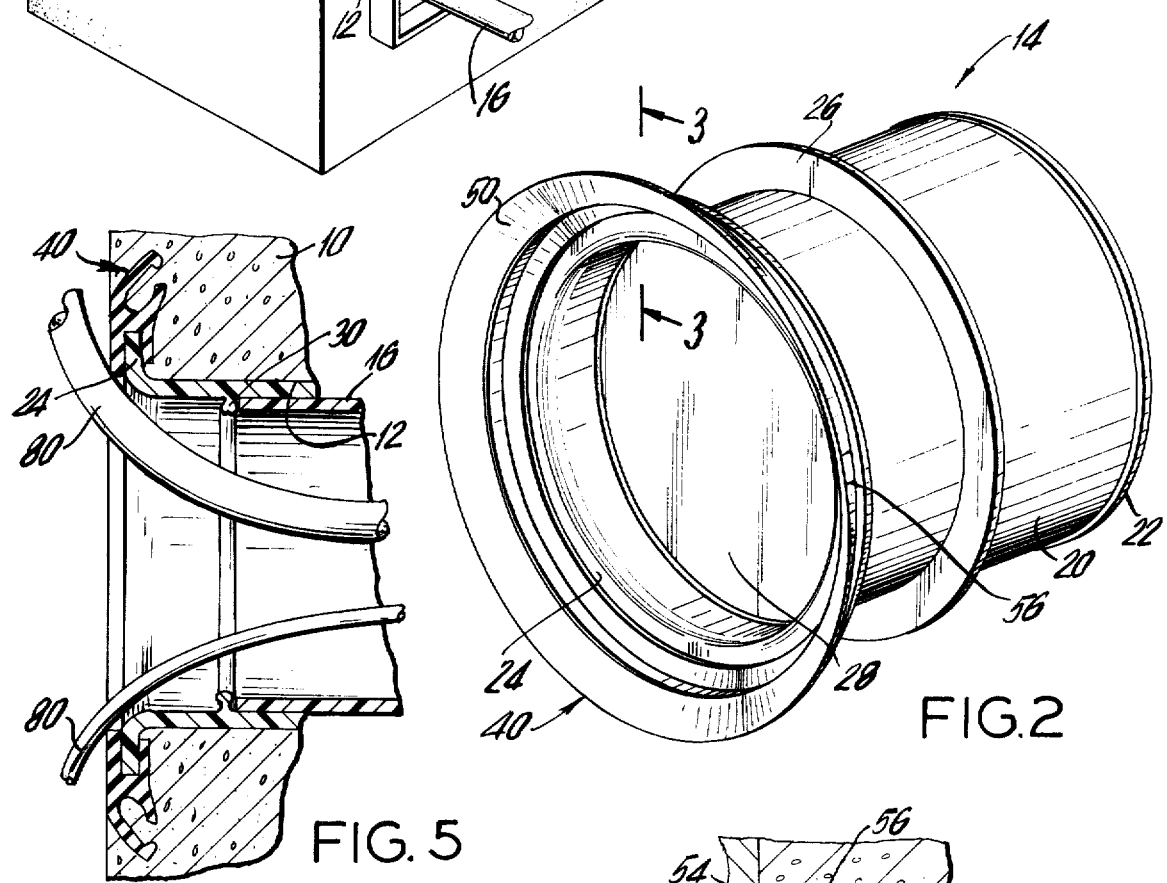
FIG. 2 is a perspective view of a duct terminator provided with a seal of the subject invention.

Referring to FIG. 2, duct terminator 14 is made of tough, durable ABS plastic material molded to rigid tolerances, and comprising a hollow cylindrical body 20 having at one end an annular edge 22, while its opposite end terminates in a flared end portion 24. Intermediate the length of the body 20, and external thereof is a water-stop rib 26 which is operative to seal off moisture from entering into the internal compartment of the underground utility vault 10. The rib 26 is intended to be embedded within the concrete of the vault, and upon expansion and contraction of the vault, rib 26 acts as a barrier or stop preventing water from passing through the opening between the body 20 and the concrete structure. Internally of the hollow cylindrical body 20, and molded integral with the body 20 is a knockout seal or partition 28, having at its peripheral edge a reduced thickness portion terminating in a bead 30 (see FIGS. 3 and 4), whereby the knockout seal 28 may be readily removed when it is desired to duct electrical or telephone conduits into the internal compartment of the underground vault 10.

Figures 3, 4:
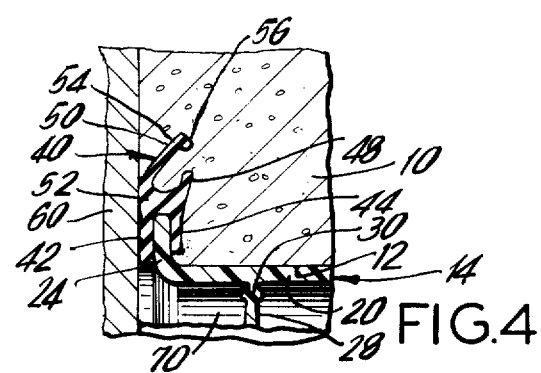
FIG. 3 is a sectional view taken along line 3—3 of FIG. 2.
FIG. 4 is a view similar to FIG. 3 but illustrating the duct terminator and the subject seal as embedded in a concrete vault.

In order to facilitate the construction of the underground vault, and in particular the embedding therein of the plastic duct terminator, as well as improve the sealing and other characteristics of the duct terminator, the subject invention provides a seal 40 which is adapted to engage the flared end 24 of the duct terminator. As more particularly illustrated in FIG. 3, seal 40 is generally of H-shaped configuration, and is an endless flexible member, preferably made of an extruded vinyl material, having a pair of leg portions 42 and 44 which are spaced a sufficient distance to form a slot for resiliently engaging the flared end 24 of the duct terminator. The opposed legs of the seal 40 include free leg 48 which extends radially outwardly from leg 44, and the remaining leg 50 is generally longer than the legs 42, 44 and 48, and forms a generally bell-mouth portion. The bell-mouth leg portion 50 includes a thickened portion 52, and a relatively thinner portion 54, and terminates at an extended portion 56 disposed at an angle to thinner portion 54. A bead 53 extends between thicker portion 52 and thinner portion 54. As shown in FIG. 3, the acute angle defined by the thicker portion 52 with the longitudinal axis of the duct terminator is less than the acute angle defined by the thinner portion 54 with the longitudinal axis of the duct terminator. The seal 40 is of unitary construction and is of slightly smaller diameter than the flared end 24 of the duct terminator 14 so as to form a resilient connection to the duct terminator. If desired, the seal 40 may be adhesively bonded to the flared end 24 by providing adhesive between the leg portions 42 and 44 of the seal 40.

FIG. 4 illustrates the casting of the underground utility vault, at which time concrete form 60, and a second, opposed concrete forms (not shown) are fixed in place prior to the pouring of the concrete. The spacing of the concrete forms is gauged so as to cause the bell-mouth portion 50 of the seal 40 to be reversibly bent, as shown in FIG. 4, with the surface of the thickened portion 52 abutting against the flat surface of the concrete form 60, and with the thinner portion 54 being reversibly bent. As shown in FIG. 4, with the pouring of the concrete of the underground utility vault 10, concrete is disposed on opposite sides of the thinner portion 54 of the bell-mouth leg 50, as well as on opposite sides of free leg 48 of the seal 40. By this arrangement, both legs 50 and 48 function as additional water-stop ribs, similar to the rib 26 of the duct terminator 14. Still further, by virtue of the resiliency of the seal 40, the latter functions to maintain the duct terminator in place during the casting operation, thereby obviating the use of a reusable rubber holding plug as heretofor employed. Still further, it should be noted that during the casting operation, as the steel concrete form 60 is positioned against the vinyl seal 40, and is pressed into place, a higher pressure area is formed in the cavity 70 thereby preventing the uncured concrete from seeping into the cavity 70. The resulting structure is both esthetically pleasing, and more structurally sound since the number of voids in the concrete is greatly minimized.

Figure 5:
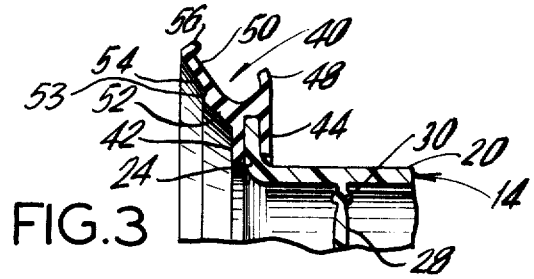
FIG. 5 is a sectional view taken along line 5—5 in FIG. 1.

Referring now to FIG. 5, when it is desired to duct telephone or electrical lines 80 into the interior of the utility vault, the outer plastic shielding pipe 16 is extended through the annular edge 22 of the duct terminator 14 until it abuts against the bead 30 of the partition 28. The latter is knocked out, and the electrical lines and telephone lines 80 are passed through the duct terminator to the interior of the underground utility vault 10. It is noted that the resilient leg 42 of the seal 40 additionally functions to provide a soft surface against which the cables 80 may be bent, thereby resisting chafing or shorting of the electrical cables.

Figure 6:
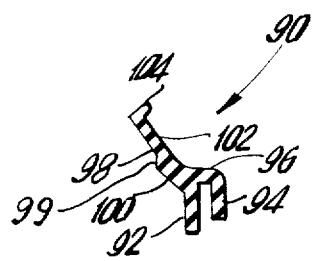
FIG. 6 is a cross-sectional view of an alternate embodiment of the subject seal.

FIG. 6 illustrates an alternate embodiment of the subject seal wherein the seal 90 comprises a pair of spaced, opposed legs 92 and 94, a bridge portion 96, and an elongated projecting leg 98 having a thickened portion 100, a thinner portion 102, and an extension 104. A bead 99 extends between thickened portion 100 and leg 98. As illustrated in FIG. 6, the acute angle defined by the thickened portion 100 with the longitudinal axis of the duct terminator is less than the acute angle defined by the leg 98 with the longitudinal axis of the duct terminator. As in the first embodiment, seal 90 is an endless flexible member preferably made of a vinyl material that may be extruded, and is configured to tightly engage the associated duct terminator.

Accordingly there is provided a new and improved seal for a duct terminator to be embodied within an underground utility vault. The new and improved seal greatly facilitates the construction of the underground vault in that it provides a means for maintaining the duct terminator in place during the forming operation, prevents concrete from seeping into the interior of the duct terminator, and after curing of the concrete, provides at least one additional water stop rib which is flexible and hence is more efficient in preventing water seeping along the exterior surface of the duct terminator into the interior of the utility vault. Since the seal is made of a flexible material the plastic memory of the seal continually applies a biasing force against the surrounding concrete so as to effect a improved water stop seal, as contrasted to the fixed rib normally provided on a duct terminator. Hence, expansion or contraction of the concrete of the vault does not affect the sealing characteristics of the subject seal. Still further, when fully installed, the seal provides a non-abrasive surface against which the electrical cables may be bent as the cables are ducted into the underground vault.

While several preferred embodiments of the invention have been herein illustrated and described, it will be understood that the invention may be embodied in other forms within the scope of the following claims.

What is claimed is:

1. In combination with a duct terminator including a cylindrical conduit and having at one end a flared bell-mouth end portion, a flexible annular seal member of generally h-shaped cross-section and including first and second spaced apart leg portions which are respectively disposed on opposite axial sides of said flared bell-mouth end portion of the duct terminator, said first leg portion being disposed axially outwardly of said bell-mouth end portion, and a third leg portion extending radially outwardly and axially outwardly of said flared bell-mouth end portion of the duct terminator, said third leg portion extending from said first leg portion to an intermediate point thereof to define a first acute angle with respect to the center line of the cylindrical conduit, and then extending from said intermediate point to the distal end of said third leg to define a second acute angle with respect to the center line of the cylindrical conduit, with said second acute angle being greater than said first acute angle.

2. The combination of claim 1 wherein said first leg portion is longer than said second leg portion and thereby extends further radially inwardly of said bell-mouth end portion of the duct terminator.

3. The combination of claim 1 wherein the portion of said third leg defining the first acute angle is thicker than the portion of said third leg defining said second acute angle.

4. The combination of claim 1 further including a fourth leg portion which extends radially outwardly and axially inwardly of said flared bell-mouth end portion of the duct terminator.

5. The combination of claim 1 further including an extension extending from the distal end of said third leg, said extension being disposed at substantially a right angle to said second acute angle.

6. The combination of claim 1 wherein said flexible material is made of an extruded vinyl material.

* * * * *